US012764085B2

(12) United States Patent
Bobotek

(10) Patent No.: US 12,764,085 B2
(45) Date of Patent: *Oct. 13, 2026

(54) CONVERSATIONAL MESSAGE SPAM DETECTION

(71) Applicant: AT&T Intellectual Property I, L.P., Atlanta, GA (US)

(72) Inventor: Alexander Bobotek, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 57 days.

This patent is subject to a terminal disclaimer.

(21) Appl. No.: 18/915,282

(22) Filed: Oct. 14, 2024

(65) Prior Publication Data

US 2025/0088476 A1 Mar. 13, 2025

Related U.S. Application Data

(63) Continuation of application No. 18/465,611, filed on Sep. 12, 2023, now Pat. No. 12,120,080.

(51) Int. Cl.

| | |
|---|---|
| ***G06F 15/16*** | (2006.01) |
| ***H04L 51/04*** | (2022.01) |
| ***H04L 51/212*** | (2022.01) |
| ***H04L 51/224*** | (2022.01) |

(52) U.S. Cl.

CPC ............ *H04L 51/212* (2022.05); *H04L 51/04* (2013.01); *H04L 51/224* (2022.05)

(58) Field of Classification Search

CPC ...... H04L 51/212; H04L 51/04; H04L 51/224

See application file for complete search history.

(56) References Cited

U.S. PATENT DOCUMENTS

| | | | | |
|---|---|---|---|---|
| 10,027,611 | B2 | 7/2018 | Oliver | |
| 11,463,582 | B1 | 10/2022 | Serban | |
| 12,120,080 | B1 * | 10/2024 | Bobotek | H04L 51/224 |
| 2008/0059590 | A1 | 3/2008 | Sarafijanovic | |
| 2020/0067861 | A1 | 2/2020 | Leddy | |
| 2020/0380074 | A1 | 12/2020 | Li et al. | |
| 2020/0382638 | A1 | 12/2020 | Yun | |
| 2020/0396258 | A1 | 12/2020 | Jeyakumar et al. | |
| 2021/0210072 | A1 | 7/2021 | Parc et al. | |
| 2022/0247797 | A1 * | 8/2022 | Leduc | H04L 65/1069 |
| 2022/0417159 | A1 | 12/2022 | Lapic et al. | |
| 2023/0403559 | A1 | 12/2023 | Prakash et al. | |

* cited by examiner

*Primary Examiner* — John B Walsh

(74) *Attorney, Agent, or Firm* — Guntin & Gust, PLC; Andrew Gust

(57) ABSTRACT

A processing system may identify a plurality of message contents within a plurality of reported messages, where each is reported as an unwanted message, determine, for each message content, a respective count comprising a number of occurrences the message content within the plurality of reported messages, identify a set of message contents within the plurality of message contents for which associated counts of the plurality of counts exceeds a first threshold, identify a source phone number that is a source of a first set of messages within the plurality of reported messages containing one or more message contents of the set of message contents, and where a number of reporting entities associated with the first set of messages exceeds at least a second threshold, and perform at least one remedial action in a communication network in response to the identifying of the source phone number.

20 Claims, 4 Drawing Sheets

200

MOST COMMON PHRASES

| PHRASE | COMPLAINANT COUNT (IN THOUSANDS) |
|---|---|
| Hello | 11.5 |
| Hi | 8.2 |
| How are you? | 6.3 |
| hi | 3.6 |
| Hey | 3.0 |
| hello | 1.9 |
| How are you | 1.7 |
| hey | .7 |
| Are you busy? | .6 |
| HI | .5 |
| Are you busy now? | .5 |
| How was your day? | .5 |
| Hello. | .4 |
| What are you doing? | .4 |
| How are you doing? | .3 |

LESS COMMON PHRASES

| PHRASE | COMPLAINANT COUNT |
|---|---|
| Are you busy or not receiving my messages? I'm just wondering | 5 |
| Are you busy today and that's why you didn't reply to my message? | 5 |
| Are you busy. I hope I'm not interrupting ☺? | 5 |
| Are you busy? I sent you a message, please get a reply | 5 |
| Are you busy? send me a message when you're free | 5 |
| Are you looking for an individual or family policy? | 5 |
| Are you feeling good today? | 5 |
| Are you feeling tired today? | 5 |
| Are you free now, let's go to Starbucks to chat and drink coffee | 5 |
| Are you free today? I think we need to talk | 5 |
| Are you free tomorrow? Let's go play golf together. | 5 |
| Hi it's Anna. Is this George? | 5 |

FIG. 2

CONVERSATIONAL MESSAGE SPAM DETECTION

This application is a continuation of U.S. patent application Ser. No. 18/465,611, filed on Sep. 12, 2023, now U.S. Pat. No. 12,120,080, which is herein incorporated by reference in its entirety.

The present disclosure relates generally to communication network security, and more particularly to methods, non-transitory computer-readable media, and apparatuses for identifying at least one source phone number that is a source of a first set of messages containing message contents of a set of message contents and where a number of reporting entities associated with the first set of messages exceeds a threshold.

BACKGROUND

Network-based spam, fraud, and scams are growing. One of the recent evolutions is conversational spam (which is sometimes referred to as "pig butchering"), where a purportedly "mistaken" or random contact is used to con a victim into losing significant value.

SUMMARY

Methods, computer-readable media, and apparatuses for identifying at least one source phone number that is a source of a first set of messages containing message contents of a set of message contents and where a number of reporting entities associated with the first set of messages exceeds a threshold are described. For example, a processing system including at least one processor may identify a plurality of message contents within a plurality of reported messages, wherein each reported message of the plurality of reported messages is reported as an unwanted message. The processing system may next determine, for each respective message content of the plurality of message contents, a respective count of a plurality of counts, the respective count comprising a number of occurrences of the respective message content within the plurality of reported messages. In addition, the processing system may identify a set of message contents within the plurality of message contents for which associated counts of the plurality of counts exceeds a first threshold. The processing system may further identify at least one source phone number that is a source of a first set of messages within the plurality of reported messages containing one or more message contents of the set of message contents, and where a number of reporting entities associated with the first set of messages exceeds at least a second threshold. The processing system may then perform at least one remedial action in a communication network in response to the identifying of the at least one source phone number.

BRIEF DESCRIPTION OF THE DRAWINGS

The teachings of the present disclosure can be readily understood by considering the following detailed description in conjunction with the accompanying drawings, in which:

FIG. 2 illustrates an example list of commonly complained-about phrases, e.g., from an example time period of interest, in accordance with the present disclosure;

To facilitate understanding, identical reference numerals have been used, where possible, to designate identical elements that are common to the figures.

DETAILED DESCRIPTION

Figure 1:
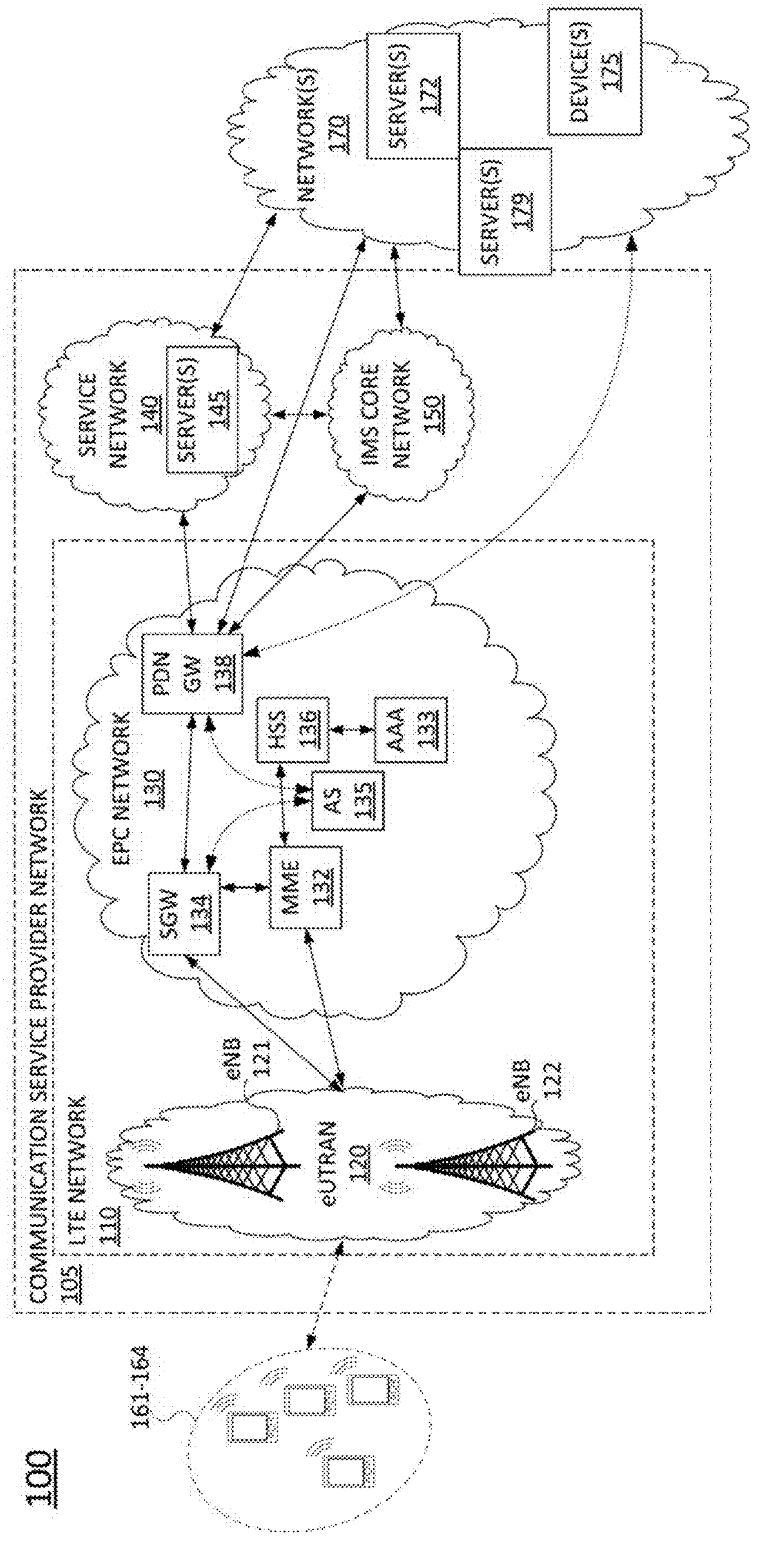
FIG. 1 illustrates an example system related to the present disclosure.

The present disclosure broadly discloses methods, computer-readable media, and apparatuses for identifying at least one source phone number that is a source of a first set of messages containing message contents of a set of message contents and where a number of reporting entities associated with the first set of messages exceeds a threshold. Notably, network-based spam, fraud, and scams are growing. One of the recent evolutions is conversational spam (which is sometimes referred to as "pig butchering"), where a purportedly "mistaken" or random contact is used to con a victim into losing significant value. Each day, millions of new malicious message conversations may be initiated. These conversations often begin with a seemingly innocuous phrase, such as "hello," and may end with significant losses through fraudulent bitcoin transactions and other mechanisms. In this regard, examples of the present disclosure address unwanted messages, e.g., conversational spam, by identifying sources/senders of such unwanted messages and implementing one or more actions in response, such as blocking these senders, notifying other network providers hosting these sources (e.g., non-mobile operators (NMOs)), and so forth.

In one example, the present disclosure may include two processes: identifying prominent malicious message contents and identifying malicious senders of these messages. The prominent malicious messages may comprise the top content (e.g., terms/phrases, or the like) that are used in unwanted text messages, which may include apparently innocuous messaging, such as "hello," "hi," and so forth. Malicious senders may be sources of these messages that fit within certain criteria, such as a number of unwanted messages sent within a given time period, such as the last three days, or the like. Both processes may utilize end-user reports of unwanted messages. For instance, users may report text messages as unwanted via a reporting service (e.g., forwarding a message to 7726 or #7726, a "report junk" feature provided by a mobile device operating system, etc.). In one example, each report may include a raw text/body of a received message, a sender phone number, a reporter/recipient phone number, and a time received/time span received, such as 30 second time block, one minute time block, or the like. A report of a junk/spam/unwanted message may comprise an explicit recipient assertion that message is unwanted and/or an explicit recipient assertion that a sender is not in recipient's contact list. As referred to herein a message may comprise a text message. In addition, as referred to herein, a text message may refer to a short message service (SMS) messaging and/or multimedia messaging service (MMS) messaging, or the like. As such, message content may include terms/phrases, images, video, and/or other animation, etc.

The first process, suspicious message content identification, may include identifying a large set of message contents and/or content templates that are used in initiating message conversations that appear to be unwanted. For instance, this may be based on user assertions that for each reported message (a) the message is unwanted and (b) that the sender is not in a list of contacts. In one example, volumetric measures and sender-recipient graphs may additionally be implemented. For instance, terms or other message contents having more than four unique complaints, five unique complaints, or the like within a given time window (e.g., a past 48 hours, a past 72 hours, or the like) may be identified as suspicious message contents, or "commonly complained-about message contents." The second process, suspicious sender identification, may comprise identifying senders that use suspicious message contents to attack/engage message recipients (e.g., suspicious message contents identified via the first process). For instance, suspicious sender identification may be based upon sending patterns as well as the content of the messages that are sent. For example, time spans of attacks, the number of suspicious messages, and numbers of distinct recipients of reported messages for each sender may comprise factors for identifying malicious senders/sources. The present disclosure may implement one or more thresholds relating to a volume of unwanted messages, measures of the intent of unwanted message(s), and/or a frequency of unwanted messages from source phone numbers. It has been found that malicious senders' phone numbers may solicit only approximately one complaint/report per 63 conversations. Thus, it should be appreciated that although relatively low thresholds may be used for blocking phone numbers (e.g., five unique complainants/reporting recipients in a 72 hour period, or the like), the actual number of attempts and/or actually initiated malicious network-based conversations may generally be much higher than those which are visible via reporting. Once suspicious senders are identified, further communications of these senders can be blocked, accounts may be suspended or closed, and so forth.

In one example, particular phone service providers may be identified as being highly associated with unwanted messaging. For instance, text spam senders may favor voice over internet protocol (VOIP) service providers or certain VoIP service providers. As such, mobile device users receiving unwanted messages may receive a disproportionate number or percentage of such unwanted messages from numbers associated with VoIP services, or a particular VoIP service provider. For instance, a single large VoIP service provider may be an unwilling host of hundreds of thousands of phone numbers (e.g., Mobile Station International Subscriber Directory Numbers (MSISDNs)). In one example, the present disclosure may also include a sender host/service provider look-up, such as using a text message routing registry (e.g., an E.164 Number mapping (ENUM) or "Electronic Number Mapping") which maps phone numbers to uniform resource locators (URLs), and which can be used to identify a VoIP host domain, or domains.

One illustrative type of cyber-fraud involves a scammer meeting someone on a dating application (app). The scammer gains the confidence and trust of the victim, and then claims to have knowledge of cryptocurrency investment or trading opportunities that will result in substantial profits. The victim is then directed to transfer large amounts of cryptocurrency to cryptocurrency wallets controlled by the scammer who ultimately disappears or "ghosts" the victim. What started on dating apps/sites has expanded to text messaging, where scammers/spammers initiate conversations with victims via seemingly innocuous messaging, such as "hello" or "hi," followed by a "sorry, wrong person" pattern. Other conversation starters include "How are you doing?," "Hi George," "Let's have dinner tonight," and so forth. A victim may respond with "I'm not George" or some other responses, and the attacker may continue the conversation with something more engaging, like "Oh. Sorry. Well, I'm Anna. You seem nice. How is your day?" Other conversation initiators may comprise seemingly innocuous images or other content, such as a photograph of a cat or dog, an animation or video clip (e.g., including memes, etc.), and so forth. In many cases, the attacker attempts to move the victim to another conversation platform, such as an over-the-top (OTT) messaging application such as Telegram, WhatsApp, etc. The ultimate goal is typically a transfer of something of value, including funds, and now predominantly cryptocurrency. Losses per victim may be in excess of 100,000 dollars.

Defending against these types of attacks may be complicated by the messaging having no evident call to action. For example, the attacker does not suggest or direct the victim to wire funds, transfer cryptocurrency, buy stock, etc. until far into a conversation, which may span several days or even weeks. Likewise, the messaging may not include other identifiers to track the attacker. For instance, there may be no uniform resource locators (URLs) or phone numbers in the text message body/content. In addition, there may be seemingly innocuous content as described above (e.g., "hi," "hello," cat memes, etc.). Compounding the problem of conversational spam is that there may be hundreds of thousands of complaints monthly, with widely dispersed NPA-nxx (area code/exchange) phone numbers, making it challenging to find and block lines. In this regard, examples of the present disclosure may include a focused algorithm that learns the active message content variants (and source network(s)) and that may take a precise action on a low number of malicious actors (e.g., phone numbers with multiple complaints that are known to have engaged in messaging identified as being associated with unwanted messaging/text spam).

It should again be noted that it has been found that these types of messages disproportionately originate with source phone numbers associated with non-mobile network operators (e.g., VoIP services that also provide for text messaging, e.g., SMS and/or MMS messaging, or the like). In addition, these phone numbers may be obtained inexpensively, anonymously, and with zero recurring cost. For instance, VOIP phone verified accounts may be obtained for less than five dollars per line. In other words, these phone numbers may be "pre-verified," such that an attacker obtaining one of these lines does not need to verify their own identity with another phone number, email address, or the like, which prevents traceability of the actors behind conversational spam and other malicious messages.

In one example the present disclosure may identify malicious message sources and may block messages from the originating phone numbers, e.g., for one month, 30 days, 60 days, etc. In one example, messages to such phone numbers may also be blocked and/or additional communications associated with such phone numbers may also be blocked (e.g., voice calls). It should be noted that blocking outgoing messages from such numbers prevents reaching of new victims, but also disrupts ongoing conversations. In one example, a network operator identifying these malicious source phone numbers may also notify the host/sending service provider (e.g., a VoIP service provider). In one example, a report may be provided periodically, e.g., daily or otherwise, with details of each phone number that is blocked, the time the decision to block is implemented, and a score (e.g., representing a spam score, a threat score, and/or a malicious activity score).

Examples of the present disclosure effectively neutralize phone numbers sourcing unwanted messages on average after approximately 200 conversations are initiated with recipients of a given target network that is being monitored and protected. Attackers may be forced to use substantially more lines/phone numbers, and with reduced success rate, thus significantly reducing the likelihood that a payoff may offset the required investment. While attackers may revert to or preferentially use other communication modalities (e.g., online dating applications, etc.), examples of the present disclosure serve to uphold the integrity and security of carrier-maintained mobile text messaging.

Examples of the present disclosure thus provide an effective defense against a highly-evasive and damaging type of cyber-fraud. In particular, examples of the present disclosure alleviate a communication network from additional traffic relating to spam/unwanted messages (as well as other communications from malicious senders, who may also be engaged in robocalling, and other malicious activities). The user experience is also improved, with fewer unwanted messages being received (and with reduced likelihood of falling victim to fraud or other manipulations). In addition, users may have increased trust in the use of text messaging, while thwarting cyber-criminals and disrupting their ability to accumulate assets and exploit additional victims. These and other aspects of the present disclosure are described in greater detail below in connection with the examples of FIGS. 1-4.

To aid understand the present disclosure, FIG. 1 illustrates an example network, or system 100 in which examples of the present disclosure may operate. In one example, the system 100 includes a communication service provider network 105. The communication service provider network 105 may comprise a Long Term Evolution (LTE) network 110, a service network 140, and a core network, e.g., an IP Multimedia Subsystem (IMS) core network 150. The system 100 may further include other networks 170 connected to the communication service provider network 105. As shown in FIG. 1, the system 100 may connect endpoint devices 161-164 with server(s) 145 in service network 140, with devices 175 in networks 170, or other endpoint devices attached to communication service provider network 105 or another communication network, and/or with other components of communication service provider network 105. The endpoint devices 161-164 may each comprise a cellular telephone, a smartphone, a tablet computing device, a laptop computer, a pair of computing glasses, a wireless enabled wristwatch, or any other cellular-capable mobile telephony and computing devices (broadly, a "mobile endpoint device") that may have a mobile phone number to which text messages may be directed (e.g., an MSISDN number). In one example, the endpoint devices 161-164 may each comprise a device of a subscriber or customer of the communication service provider network 105.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the 3$^{rd}$ Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeB (eNB) 121 and eNodeB (eNB) 122 in the eUTRAN 120, are in communication with the EPC network 130. In operation, LTE user equipment or user endpoints (UE), such as endpoint devices 161-164, may access wireless services via the eNodeBs 121 and 122 located in eUTRAN 120. It should be noted that any number of eNodeBs can be deployed in an eUTRAN.

In EPC network 130, network devices Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G and 3G wireless networks and the like.

In addition, EPC (common backbone) network 130 may comprise a Home Subscriber Server (HSS) 136 that contains subscription-related information (e.g., subscriber profiles), registration data, and network policy rules, and that performs authentication and authorization of a wireless service user. Thus, HSS 136 may store information regarding various subscriber/customer devices, such as endpoint devices 161-164. HSS 136 may also maintain and provide information about subscribers' locations. In one example, Authentication, Authorization, and/or Accounting (AAA) server 133 obtains subscriber profile information from HSS 136 to authenticate and authorize endpoint devices to connect to EPC network 130 via Institute for Electrical and Electronics Engineers (IEEE) 802.11 (Wi-Fi)/non-3GPP access networks. The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW.

Figure 4:
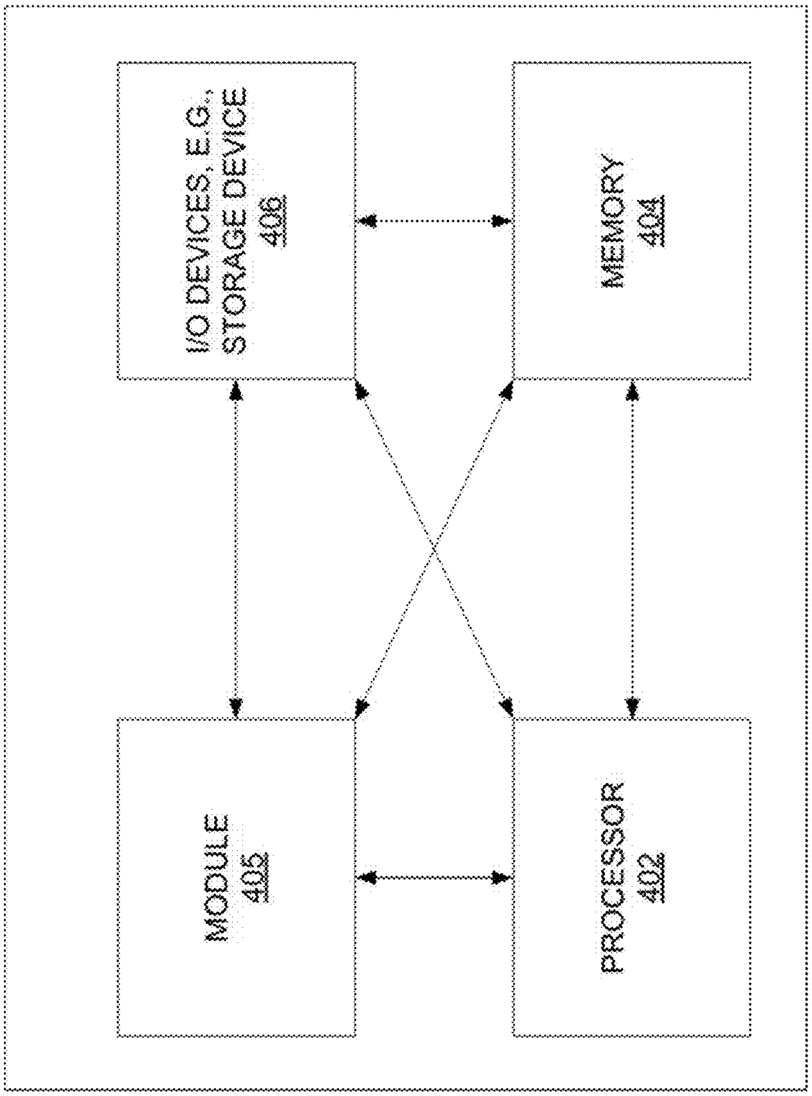
FIG. 4 illustrates an example high-level block diagram of a computing device specifically programmed to perform the steps, functions, blocks, and/or operations described herein.

In one example, system 100 may also include an application server (AS) 135. In one example, application server 135 may comprise computing device or processing system, such as computing system 400 depicted in FIG. 4, specifically configured to provide one or more functions for identifying at least one source phone number that is a source of a first set of messages containing message contents of a set of message contents and where a number of reporting entities associated with the first set of messages exceeds a threshold, in accordance with the present disclosure. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 4 and discussed below) or multiple computing devices collectively configured to perform various steps, functions, and/or operations in accordance with the present disclosure.

In one example, service network 140 may comprise one or more devices, such as server(s) 145 for providing services to subscribers, customers, and/or users. For example, communication service provider network 105 may provide a cloud storage service, web server hosting, and other services. As such, service network 140 may represent aspects of communication service provider network 105 where infrastructure for supporting such services may be deployed. It should be understood that service network 140 may include any number of components to support one or more services that may be provided to one or more subscribers, customers, or users by the communication service provider network 105.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, a peer network (e.g., a cellular network and/or LTE network of a different telecommunication service provider), and the like. In one example, the networks 170 may include different types of networks. In another example, the networks 170 may be the same type of network. In one example, the networks 170 may represent the Internet in general. Devices 175 may include personal computers, desktop computers, laptop computers, personal digital assistants (PDAs), tablet computing devices, endpoint devices of a same or a similar nature as endpoint devices 161-164, or any other devices for wireless and/or wired communications. Devices 175 may also include servers, such as web servers, storage devices, enterprise servers, email servers, and so forth. In one example, devices 175 may represent cloud desktops which may emulate one or more physical endpoint devices, and which may be used by attackers for initiating text spam and other malicious communications. In one example, endpoint devices 161-164 may communicate with devices 175 in networks 170 via PDN GW 138 and/or via PDN GW 138 and IMS core network 150, e.g., for voice over LTE (VOLTE)-based calls or Wi-Fi calling.

In one example, AS 135 may be configured and deployed in the system 100 as shown to perform various operations for identifying at least one source phone number that is a source of a first set of messages containing message contents of a set of message contents and where a number of reporting entities associated with the first set of messages exceeds a threshold, in accordance with the present disclosure. For instance, AS 135 may comprise, maintain, and/or access a database of reported unwanted message information. The database may include unwanted message reports, e.g., each report including a raw text/body of a received message (which in some cases may comprise an image, video, or similar content), a sender phone number, a reporter/recipient phone number, and a time received/time span received. For instance, AS 135 may obtain reports of unwanted text messages that are forwarded to #7726 from endpoint devices 161-164, etc. In one example, AS 135 may represent a routing destination of these reported messages. In another example, another component of communication service provider network 105 may collect these reports, such as server(s) 145, another component of EPC network 130 (not shown), or the like, where AS 135 may subsequently access these reports for analysis. Alternatively, or in addition, AS 135 may obtain reports of unwanted messages, e.g., as reported to a "report junk" service via a "report junk" mobile device feature. In one example, a "report junk" service may be hosted by a 3$^{rd}$ party, such as mobile device manufacturer and/or mobile operating system provider. Thus, for example, endpoint devices 161-164, etc. may report unwanted messages to server(s) 172, which may be maintained by another entity for such purposes. In one example, AS 135 may then obtain these reports from server(s) 172 to compare or supplement the reports already obtained by AS 135. In one example, AS 135 may enhance the reports with additional information, such as a carrier associated with a sender phone number (e.g., a VoIP service provider, another mobile network operator (MNO), etc.). For instance, AS 135 may perform an ENUM lookup as described above.

It should be noted that the messages reported by endpoint devices 161-164, etc. may be received from other ones of endpoint devices 161-164, other endpoint devices of subscribers of communication service provider network 105 and/or LTE network 110, and so forth. In addition, the reported messages may be received from endpoint devices associated with other cellular network service providers, as well from phone numbers associated with VoIP service providers that also enable text messaging (e.g., SMS and/or MMS, or the like). For instance, in the example of FIG. 1, device(s) 175 may represent the devices used by attackers to engage in conversational spam (or additional text-message based or other malicious network activities) directed toward endpoint devices 161-164 and/or other endpoint devices served by communication service provider network 105 and/or LTE network 110.

In addition to unwanted message reports, AS 135 may further determine and store (e.g., as a list or otherwise) the most utilized message contents in the reported messages, along with counts of the number of occurrences of each message content within the unwanted messages that are reported and/or counts of the number of unique complainants/reporting recipients associated with each message content, e.g., over a defined time period, such as the last 48 hours, the last 72 hours, etc. In one example, message contents with more than a threshold number of occurrences and/or reporting recipients may be designated as being associated with conversational spam initiation. For instance, as described above, message contents having more than 4 unique complaints, 5 unique complaints, or the like within a given time window (e.g., a past 24 hours, a past 48 hours, a past 72 hours, or the like) may be identified as suspicious message contents, or "commonly complained-about message contents."

AS 135 may further identify and store the identities of source phone numbers associated with the sending of reported unwanted messages. For instance, in one example, AS 135 may identify source phone numbers that have sent more than a threshold number of messages containing suspicious message contents (e.g., from the same or a different time period over which the suspicious message contents are identified, such as the last 48 hours, the last 72 hours, etc.). In one example, the number of such messages sent per source may be counted from among the reported messages collected by AS 135, and the threshold may be established in view thereof.

Alternatively, or in addition, in another example, the number of such messages may be from among all messages that are visible to an operator of communication service provider network 105. For instance, some users may enroll in a network-based device protection service and may request that communication service provider network 105 scan incoming messages for malicious content, such as all URLs, known malicious URLs, malicious scripts, marketing spam, and so forth. In one example, the communication service provider network 105 may not store the contents of such unreported messages, but may process the messages solely for the purpose of identifying malicious links, known suspicious phrases, etc. In addition, in one example, the scanning may not process the actual contents of the messages but may process a hash of the contents that can be matched to a similar hash of known malicious content.

In one example, AS 135 may identify source phone numbers associated with the sending of reported unwanted messages in accordance with a threshold associated with a number of complainants/reporting recipients per source phone number (e.g., at least six independent reporting recipients, at least seven, etc.). In one example, this number may be tuned/adjusted based upon a number of false positives that may be subsequently identified. Alternatively, or in addition, AS 135 may implement a threshold associated with a number of complainants/reporting recipients per source and for which a time span over which reported messages of a given source are reported exceeds a threshold time period. For instance, this may comprise at least four independent reporting recipients with complaints about messages from a given sender, where the reports are not within 90 seconds of each other. In particular, complaints more than 90 seconds apart are treated as more probative. This may prevent taking action against a sender based on a single message that may be sent to multiple recipients, and where a number of the recipients may report the message as being unwanted. Similarly, AS 135 may implement a threshold associated with a number of complainants/reporting recipients per source for messages that exclude one or more message contents from among the plurality of message contents having highest counts from among the plurality of counts. For example, this may comprise at least three independent reporting recipients, at least four independent reporting recipients, etc., where the complaints/reports are for text messages that exclude the top two suspicious message contents, the top four suspicious message contents, or the like. For instance, although these may be the most common message contents used to initiate conversational spam, their use may be so widespread (e.g., for legitimate text messages as well) that such message contents may be uninformative or may risk too many false positives for purposes of identifying malicious source phone numbers.

With respect to the phone number identified as being associated with the sending of reported unwanted messages, AS 135 and/or communication service provider network 105 may implement one or more remedial actions. For instance, AS 135 may add the identified source phone numbers to a list of malicious sources. In one example, the list may be made available and accessible to other network components of communication service provider network 105 for various uses. Alternatively, or in addition, AS 135 may block communications of the at least one source via the communication service provider network 105. For instance, AS 135 may transmit instructions to PDN GW 138 to block additional communications originating from the phone numbers in the list. Thus, any of devices 175 attempting to communication with endpoint devices 161-164, etc. using such a phone number may be blocked. In one example, AS 135 may further transmit notifications to one or more service provider entities associated with the identified source phone numbers. For instance, server(s) 179 may represent system components of a VoIP service provider (or a plurality of VoIP service providers) through which the identified source phone numbers are registered, and where the malicious actors may have accounts. Such VoIP service providers may then choose to implement any additional actions against device(s) 175 associated with an identified phone number, any accounts associated with such phone numbers and/or the associated device(s), and so forth.

Although examples of the present disclosure may identify sources of unwanted messages that originate predominantly with VoIP service providers, the present disclosure is not limited to such examples. Thus, for instance, communication service provider network 105 may suspend phone numbers (e.g., MSISDN numbers), subscriber identity modules SIM(s) associated with such numbers, and/or accounts associated with such SIM(s), may limit services (e.g., the ability to send messages), may rate limit such SIM(s) and/or devices or phone numbers associated with such SIM(s), may assign a reduced priority level to communications for one or more endpoint devices associated with the suspect phone numbers, may disable access to the telecommunication service provider network 105 by such SIM(s), devices, and/or phone numbers, and so forth.

As noted above, in one example, AS 135 may implement remedial actions via instructions to other network elements. For example, SGW 134, and/or PDN GW 138 may be instructed to prevent device attachment to LTE network 110, to block, rate limit, and/or de-prioritize traffic (e.g., outbound and/or inbound text messages, calls, and/or data communications for offending SIM(s) and/or devices, accounts, and/or phone numbers, etc.). For instance, packets/flows, calls, and/or text messages may be tagged with different priority labels by such devices. Similarly, in one example, a short message service center (SMSC) or the like may be instructed to block, delay, or otherwise process messages from particular phone numbers in a different manner. Additional operations of AS 135 are described in greater detail below in connection with the example method 300 of FIG. 3. Similarly, in another example, one or more other network-based systems may subscribe to or otherwise obtain phone number reputations/scores from AS 135. In turn, these one or more other systems may then apply various data vectors as inputs/predictors to one or more threat detection models, and may further implement remedial actions of a same or similar nature based upon the output(s) of such detection model(s).

In one example, AS 135 may implement one or more thresholds for implementing one or more remedial actions. To illustrate, AS 135 may generate scores for identified source phone numbers, which may be based on a number of reported messages per source phone number (e.g., in a given reporting time period). In one example, the scores may be further based on a number of independent reporting recipients per source phone number (e.g., in a given reporting time period). In one example, the scores may be further based on a message volume or a message frequency of each source phone number (e.g., in the given reporting time period, e.g., over the same time period the reported messages are analyzed, where the volume or frequency is for all messages observed from a given source phone number, not just those that are reported as unwanted/spam). In one example, the at least one remedial action may be further in response to the at least one score. For instance, an identified phone number may be added to a list of malicious phone numbers and the score may be stored along with the phone number. However, when the score exceeds an additional threshold, then the identified phone number may also have its sent messages (and/or other communications) blocked by the communication service provider network 105. In one example, the scores may be reported to server(s) 179 along with the identities of the phone numbers identified as being malicious.

In one example, a score for a phone number may be based on one or more additional factors. For instance, the score may comprise a weighted sum of factors such as A*number of complaints+B*a number of unique complainants/reporting recipients, etc. In one example, the score may add additional factors, such as C*a number of two-way communications, D*a fixed value assigned to a source service provider associated with the phone number (e.g., a fixed value assigned to a particular VoIP service provider or other service provider hosting the phone number), E*account age (if available from records of communication service provider 105 and/or from a peer service provider), F*an intent value associated with the message contents(s), and so forth.

In one example, a score may comprise a value from a different range of values such as 1 to 5, 1 to 10, 0 to 10, 1 to 100, 0 to 100, −10 to +10, etc. For instance in a range of 0 to 100, zero (0) may be indicative of near certain lack of malicious activity, while 100 may be indicative of near certainty that a phone number is associated with malicious activity (or a specific type of malicious activity, such as conversational spam). Accordingly, a value of 75 may be indicative of a high likelihood of malicious activity, while a value of 15 may be indicative of a low likelihood of malicious activity. It should be noted that the foregoing are just several possible value ranges that may be implemented in examples of the present disclosure. For instance, in another example, a lower value in a range may be indicative of a poor reputation (high likelihood of malicious activity), while a higher value may be indicative of a more positive reputation. In still another example, there may be no upper limit on the range of values for a score. For instance, the score may continue to increase (indicating a greater likelihood of malicious activity) without limit with receipt of more complaints against a phone number, more unique complainants, etc. Thus, these and other modifications are all contemplated within the scope of the present disclosure.

In one example, AS 135 may identify a number of messages for which an identified malicious source phone number is a recipient within a defined time period associated with the plurality of reported messages, e.g., over the same time period the reported messages are analyzed. In addition, in such an example, AS 135 may also add the at least one source to a list of conversational spam sources, when a threshold associated with the number of response messages is exceeded. In other words, AS 135 may further identify that the at least one source phone number is specifically a source of conversational spam, e.g., distinguishing from other types of spam/spam sources, or other malicious activities, such a marketing spam, poison link spam, etc. In addition, in such an example, when the threshold associated with the number of response messages is exceeded, AS 135 may also transmit a notification to server(s) 179 with an identification of one or more source phone numbers as sources of conversational spam.

It should be noted that in contrast to some other types of spam activity, it is expected that there may be a significant volume of two-way communications associated with such source phone numbers, since a common tactic may include engaging victims in seemingly normal conversation. These victims may no longer be able to report messages as unwanted after engaging in multiple communications with an attacker over a conversation/text message chain. However, combined with reports from users reporting the initial messages from attackers as being unwanted, the existence of more than a nominal volume of two-way communication may provide further indication of the type of text spam activity being conversational spam. In one example, the type(s) of remedial actions may be differentiated based on the type of spam activity detected. For example, communication service provider network 105 may provide warnings to endpoint devices 161-164 that may have engaged in communications with attackers' source phone numbers that further communications have been blocked and that the source phone numbers are associated with conversational spam. In addition, endpoint devices 161-164 may provide information on prevalent patterns of these attackers (such as shifting to other communication modalities, steering the users towards investment recommendations, cryptocurrency transactions, etc.) to alert the users of endpoint devices 161-164 if they were involved in any attempts that fit such patterns.

It should again be noted that various data points contained in a database of reported unwanted message information may be obtained from various sources within the communication service provider network 105. For instance, complaints associated with particular phone numbers may be obtained from a reporting service of the communication service provider network 105. For example, other subscribers/endpoint devices may be enabled to report spam/suspected spam by forwarding messages to #7726 (SPAM). The communication service provider network 105 may thus store records indicative of complaint history for particular phone numbers, SIMs, and/or subscriber accounts which may include the dates/times of particular complaints, the suspect messages/message content, the locations, phone numbers, and/or other identifiers of complainants, a count of a number of complaints, a complaint rate, a ratio of a total number of messages to a number of messages soliciting complaints, and so forth. Similarly, in one example, AS 135 may subscribe to notifications/alerts from a message scanning service that may scan messages for known malicious URLs, domains, IP addresses, or the like. Alternatively, or in addition, AS 135 may itself be configured to provide such a scanning service and may discover offending messages and the sources thereof accordingly. Accordingly, in one example, AS 135 may be configured to identify and distinguish from a plurality of different types of spam activity, such as conversational spam, malicious link spam, etc.

In one example, AS 135 may also obtain network traffic data from elements of communication service provider network 105, such as PDN GW 138, SGW 134, an SMSC (not shown), and so forth. For instance, these network elements may collect call detail records (CDRs), flow records, and other information which may be forwarded to AS 135 and/or which may be retrieved by AS 135 from such network elements. Alternatively, or in addition, AS 135 may access network traffic data from a record store, e.g., a database system hosted via one or more devices of communication service provider network 105, such as server(s) 145. It should also be noted that in one example, one or more data points may be obtained from or supplemented by additional information from one or more external sources, such as data shared among one or more other network operators. In one example, network traffic data may be used in conjunction with the reported message information to corroborate the identification of spam sources, to provide further information about such phone numbers, such as associated IP addresses, geolocation information, and so forth.

It should also be noted that the system 100 has been simplified. In other words, the system 100 may be implemented in a different form than that which is illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN), and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, AS 135 may be integrated with any one or more of such components. In another example, functions described above in connection with AS 135 may alternatively or additionally be performed by server(s) 145 in service network 140. In addition, various elements of eUTRAN 120, EPC network 130, and IMS core network 150 may be omitted for clarity, including gateways or border elements providing connectivity between such networks. Similarly, due to the relatively large number of connections available between devices in the system 100, various links between AS 135, MME 132, SGW 134, AAA server 133, HSS 136, eNodeBs 121 and 122, PDN GW 138, and other components of system 100 are also omitted for clarity.

In addition, although aspects of the present disclosure have been discussed above in the context of a long term evolution (LTE)-based network, examples of the present disclosure are not so limited. For example, the teachings of the present disclosure can be applied to other types of cellular networks (e.g., a 5G network (e.g., a standalone (SA) 5G network), an LTE/5G hybrid network (e.g., a non-standalone (NSA) 5G network), a 6G network, and the like, or a future technology or standard-based network). Similarly, although AS 135, HSS 136, AAA server 133, and so forth are illustrated as components within EPC network 130 having a particular configuration, in other examples, any one or more of these components may be deployed in a different configuration. For example, HSS 136 and/or AAA server 133 may be deployed in IMS core network 150, and so on. Thus, these and other modifications are all contemplated within the scope of the present disclosure.

FIG. 2 illustrates an example list 200 of commonly complained-about phrases, e.g., from an example time period of interest, in accordance with the present disclosure. As shown in the example of FIG. 2, the most common phrases may appear in thousands of text messages for which complaints are received (e.g., over an investigative time period, such as the last 24 hours, the last 48 hours, the last 72 hours, a most recent 48 or 72 hour window over which reports/records are available, etc.). It should be noted that the numeric column indicates the number of complainants/reporting recipients, which may not have a 1:1 correspondence to the number of complaints/reports for messages containing given phrase. For example, an individual reporter may submit multiple complaints/reports about the same message or an attacker may send the same message three times to an individual recipient, who may submit three separate reports about the three separate/but identical-content messages. However, these respective metrics may generally track with one another. It should be noted that the message contents are seemingly innocuous, but may be calculated to obtain a response, rather than an outright ignoring or discarding of the message. While users who may be more vigilant about unsolicited messages may report such messages containing these phrases, attackers may hope that such phrases may still result in a relatively higher response rate from potential victims.

A variety of less common phrases may also be used to initiate conversations with potential victims, such as "Are you free tomorrow?, or Let's go play golf together." For instance, a variety of phrases may have as few as five unique complainants over the time period of investigation, but may still be considered as indicative of malicious activity. It should be noted that FIG. 2 may illustrate phrases from the top and the bottom of the list 200 in terms of rankings by number of complainants (in this example, a threshold of five unique complainants may be implemented for identifying suspicious phrases). It should also be noted that there may be a greater number of example phrases/message content at the bottom of the list 200 than shown in FIG. 2. For instance, there may be hundreds or thousands of phrases for which five unique complainants have reported messages within the investigation time period.

It should also be noted that while many phrases may solicit more complaints and unique complainants, phrases/message contents near the bottom of the list may still be highly probative of malicious activity. For instance if there is just one complaint/complainant, it may be probable that "Hi it's Anna. Is this George?" is an innocent mistake by an actual person named Anna who is looking for a real contact named George, but sent the message to the wrong recipient by accident. However, in a three day window in which this precise text message content may solicit five unique complainants, this may be strongly indicative of a malicious actor. It should again be noted that the number of complaints per number of recipients may follow an average ratio of more than 1:60, indicating that this exact message may have been sent to hundreds of potential victims over the course of 72 hours.

It should be noted that FIG. 2 presents just one illustrative example of a suspicious phrase list 200. Thus, it should be appreciated that in other, further, and different examples, a suspicious phrase list may include additional or different information, such as a column of a number of reports of unwanted messages per phrase. In one example, the list 200 may be part of a database of reported unwanted text message information. Thus, for example, entries in the list 200 may include links to additional information in the database, such as source phone numbers associated with text messages containing such phrases. Alternatively, each entry in the list 200 may include a field with a list of the source phone numbers, a list of reporting recipient phone numbers (and/or SIMs or other account identifier(s)), and so forth. As illustrated in FIG. 2, the list 200 may be in order of "suspiciousness." However, in other examples, entries/records may be listed in a different order, such as chronologically in order of first appearance of respective phrases in text messages reported within an investigation time period, etc.

The example of FIG. 2 relates to message contents of a text type. However, as discussed above, examples of the present disclosure may alternatively or additionally relate to other types of message content, such as images, video or other animation, etc. Accordingly, in one example, the list 200 may be expanded to include entries from message contents of one or more additional types of message content. Alternatively, or in addition, in one example, the present disclosure may maintain separate lists (e.g., ordered lists) for respective types of message contents. For instance, a database of reported unwanted message information may include an additional list in order of suspiciousness for images found in reported messages, and so forth. In addition, the same or separate thresholds, rules, or the like for identifying suspicious message contents and/or suspicious source phone numbers may be implemented in connection with such list(s).

It should also be appreciated that a database of reported unwanted message information may also include a table or list of phone numbers (not shown), where counts of the number of reported unwanted messages, counts of the number of reporting recipients (number of complainants), a score (e.g., a reputation score of a phone number, if different from a count of the number of reported messages and/or complainants), a list or links to list 200 of specific phrases used by respective phone numbers, and so forth. In addition, in the example of FIG. 2, the state of the list 200 may be based on a preceding 48 hours, a preceding 72 hours of activity, or the like. However, in another example, a longer or shorter time window may be used. In another example, the time window may be tuned/adjusted (e.g., periodically or otherwise) based on other factors, such as whether the network is currently experiencing relatively high levels of malicious activity (e.g., shorter time window(s) may be used) or relatively low levels of malicious activity (e.g., longer time window(s) may be used). Thus, these and other modifications are all contemplated within the scope of the present disclosure.

Figure 3:
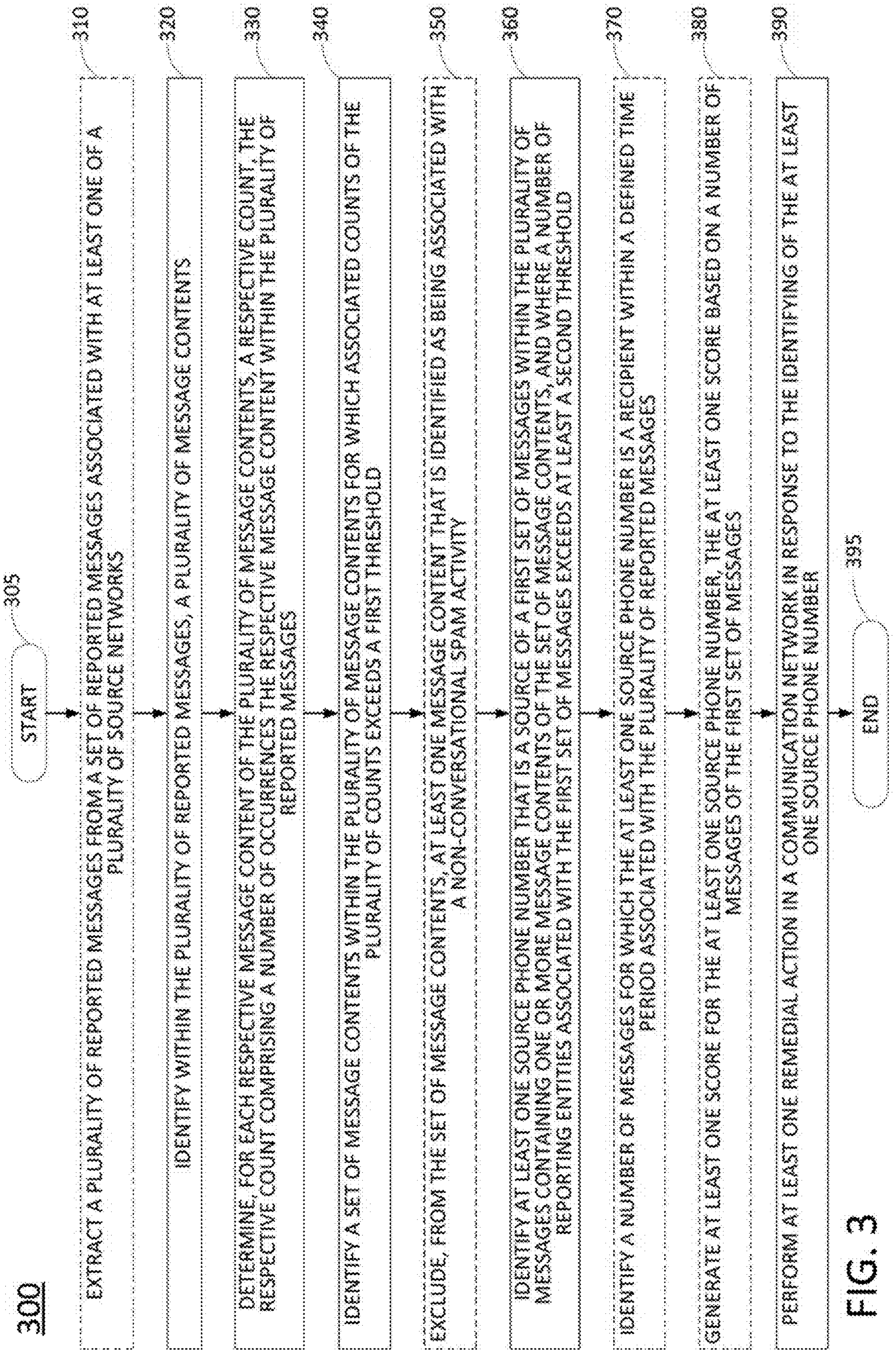
FIG. 3 illustrates a flowchart of an example method for identifying at least one source phone number that is a source of a first set of messages containing message contents of a set of message contents and where a number of reporting entities associated with the first set of messages exceeds a threshold.

FIG. 3 illustrates a flowchart of an example method 300 for identifying at least one source phone number that is a source of a first set of messages containing message contents of a set of message contents and where a number of reporting entities associated with the first set of messages exceeds a threshold, in accordance with the present disclosure. In one example, steps, functions and/or operations of the method 300 may be performed by one or more components of the example system 100, e.g., a server, such as 135 or server(s) 145 in FIG. 1, or any one or more components thereof (e.g., a processor, or processors, performing operations stored in and loaded from a memory or distributed memory system) or AS 135 and/or server(s) 145 in conjunction with other components of the system 100 such as PDN GW 138 and/or SGW 134, server(s) 172, and so on. In one example, the steps, functions, or operations of method 300 may be performed by a computing device or processing system, such as computing system 400 and/or a hardware processor element 402 as described in connection with FIG. 4 below. For instance, the computing system 400 may represent at least a portion of a platform, a server, a system, and so forth, in accordance with the present disclosure. In one example, the steps, functions, or operations of method 300 may be performed by a processing system comprising a plurality of such computing devices as represented by the computing system 400. For illustrative purposes, the method 300 is described in greater detail below in connection with an example performed by a processing system (e.g., deployed in a communication network). The method begins in step 305 and may proceed to optional step 310 or to step 320.

At optional step 310, the processing system may extract a plurality of reported messages from a set of reported messages associated with at least one of a plurality of source networks. In one example, the plurality of reported messages may comprise messages associated with at least one selected source network (e.g., that is different from a communication network in which the processing system is deployed). For instance, the at least one selected source network may be designated as being associated with a high volume of unwanted text messages. However, in one example, the method 300 may apply to reported unwanted messages from phone numbers associated with the network in which the processing system may be deployed and/or a plurality of different networks. As referred to in this instance, a source network may include a VoIP service provider, a cellular network operator, a mobile virtual network operator (MVNO), or the like. In one example, the plurality of reported messages may also comprise messages reported within a defined time period (an investigation time period), e.g., the last 3 days, 72 hours prior to the last available record, etc. In addition, as referred to herein, a message may refer to a text/SMS message, MMS message, or the like, which may comprise message content in the form of text (including characters, such as emojis, etc.), images, video, and/or other animation.

In one example, the reported messages may be reported by respective reporting recipients/complainants. Alternatively, or in addition, at least a portion of the reported messages may be reported by another automated system. For instance, as mentioned above, some users may enroll in a network-based device protection service, such as a spam filtering tool, that may scan incoming messages for malicious content, such as all URLs, known malicious URLs, marketing spam, and so forth. Alternatively, or in addition, users may deploy device-based spam filtering, which may similarly report detected messages that are filtered as spam/unwanted messages. In one example, one or more machine learning models may be trained to identify terms/phrases (and/or other message contents) that are likely initiators of conversational spam and to add these to the set of reported messages. For instance, a machine learning model may be trained based upon terms/message contents contained within previously reported messages to classify new messages as being wanted/unwanted. For example, a message containing a term or other message content that is the same as or similar to terms and/or other message contents known to be associated with conversational spam may be classified as unwanted (or likely unwanted) and then reported (or added to a list of unwanted and/or likely unwanted messages). In one example, other factors/predictors in addition to message content may also be used in the training of the model and thus in the classifications/model outputs. For instance, this may include a message sender location, IP address, phone number, NPA-NXX, or the like (e.g., a prevalence of unwanted message origination may be associated with certain countries, regions, networks, etc.), message sender device type (e.g., a prevalence of unwanted message origination may be associated with certain device types, communication technology (e.g., VoIP), etc.), SIM manufacturer (e.g., certain SIM sources may have higher association with text spam than others), and so forth. The machine learning model may be of the same or a similar nature as the example machine learning model types described above. It should also be noted that reported messages may be obtained from within a network in which the processing system is deployed (e.g., by a network operator thereof), but may also include messages reported to other network operators or third parties, which may be shared with the processing system.

At step 320, the processing system identifies, within the plurality of reported messages, a plurality of (unique) message contents, wherein each reported message of the plurality of reported messages is reported as an unwanted message (e.g., by a respective reporting entity (e.g., a reporting recipient/complainant and/or an automated system such as described above)).

At step 330, the processing system determines, for each respective message content of the plurality of message contents, a respective count of a plurality of counts, the respective count comprising a number of occurrences the respective message content within the plurality of reported messages. In one example, for the each respective message content of the plurality of message contents, the respective count of a plurality of counts may comprise the number of occurrences the respective message content within the plurality of reported messages and a count modifier based upon a similarity measure of one or more other message contents of the plurality of message contents. For instance, the similarity measure may comprise a similarly, or distance measure within a feature space representative of the message contents. For instance, a distance measure may be based upon term embeddings of the respective term and the one or more other terms (e.g., embeddings based on word2vec, glove, fasttext, etc.). Similarly, image embeddings may be used to represent respective images from which distances may be computed (and so forth for other content types). Other distance/similarity metrics may be based on hash algorithms, clustering mechanisms, or the like to associate similar phrases (and/or other message contents) and to resist polymorphism.

At step 340, the processing system identifies a set of message contents within the plurality of message contents for which associated counts of the plurality of counts exceeds a first threshold (e.g., four, five, etc.).

At optional step 350, the processing system may exclude, from the set of message contents, at least one message content that is identified as being associated with a non-conversational spam activity. For instance, the at least one message content may be identified as being associated with a marketing activity in accordance with a classification model for detecting marketing activity in messages. Similarly, the at least one message content may include a URL (which may or may not be known to be malicious), and so forth. In one example, a message content may be excluded based upon message content intent. To illustrate, "Hello" is a common greeting and may only weakly indicate malicious conversational intent (but is associated with conversational spam). However, "*#@*off" indicates strong negative conversational intent. Thus, in one example, intent factors may be useful for avoiding false positives, such as cases where an unhappy recipient of a group spam message chooses to reply-all with "*#@*off". In one example, an intent of a message content may be identified in accordance with an intent model, e.g., an MLM/MLA that is trained to classify and/or score the "intent" of a term (or other message content, such as an image, etc.) as positive/negative, positive/neutral/negative (or one of a number of categories ranging from highly positive to highly negative), and/or to output a score on a positive/negative scale, etc. In one example, negative intent messages exceeding a threshold, falling within a particular category, etc. may be excluded at step 350. For instance, these may be associated with harassment or other types of malicious activity (e.g., in conjunction with other indicia), but may not be associated with conversational spam. However, in another example, such message contents may remain in the set, where the processing system may identify different types of unwanted message sources at subsequent steps (e.g., conversational spam source, unsolicited marketing source, source of malicious links, harassment, etc.).

At step 360, the processing system identifies at least one source phone number that is a source of a first set of messages within the plurality of messages containing one or more message contents of the set of message contents, and where a number of reporting entities associated with the first set of messages exceeds at least a second threshold. For example, the at least the second threshold may comprise a threshold associated with a number of complainants/reporting entities per source phone number (e.g., at least seven independent reporting recipients or other reporting entities), a threshold associated with a number of reporting entities per source phone number and for which a time span over which reported messages of a given source phone number are reported exceeds a threshold time period (e.g., at least four independent reporting entities with complaints/reports not within 90 seconds of each other, or the like), a threshold associated with a number of reporting entities per source phone number for messages that exclude one or more message contents from among the plurality of message contents having highest counts from among the plurality of counts (e.g., at least three independent reporting recipients, where the complaints of such reporting recipients exclude the top message contents, the top four message contents, etc.), and so on. In one example, the at least the second threshold may comprise a plurality of thresholds, e.g., including two or more of the above, or the like.

In one example, step 360 may comprise identifying a source phone number that is a source of a first set of messages within the plurality of reported messages containing one or more message contents of the set of message contents, and where a number of the first set of messages exceeds a threshold (e.g., as an alternative or in addition to the number of reporting entities of the first set of messages exceeding a threshold). In other words, one or more thresholds relating to a number of reporting entities and/or a number of the first set of messages may be implemented at step 360. However, it should be noted that a threshold associated with the number of reporting recipients may prevent malicious and/or erroneous reporting by a single user/recipient. For example, an individual recipient on a distribution list may wish to no longer receive messages from a source associated with such a list, but rather than request to be removed from the list, the recipient may instead report the source phone number. A user may similarly have a disagreement with a friend and may report multiple messages as unwanted as part of a personal feud. Both of these scenarios illustrate that complaints from multiple entities against a same source phone number may be more probative of actual spam activity than complaints from a single reporting recipient.

At optional step 370, the processing system may identify a number of messages for which the at least one source phone number is a recipient within a defined time period associated with the plurality of reported messages (e.g., over the same time period the reported messages are analyzed (or a different time period), where the volume or frequency is for all messages observed from the at least one source phone number, not just those that are reported as unwanted/spam).

At optional step 380, the processing system may generate at least one score for the at least one source phone number, the at least one score based on a number of messages of the first set of messages (the number of reported messages from among the plurality of reported messages associated with the at least one source phone number, e.g., for which the at least one source phone number is a source). In one example, the at least one score may be further based on a number of independent reporting entities reporting the reported messages from among the first set of messages (reported messages that are associated with the at least one source phone number). In one example, the at least one score may be further based on at least one of: a message volume or a message frequency of the at least one source phone number within a defined time period associated with the plurality of reported messages (e.g., over the same time period the reported messages are analyzed, or a different time period) where the volume or frequency is for all messages observed from the at least one source phone number, not just those that are reported as unwanted/spam). In one example, the score may comprise a weighted sum of factors. In one example, the score may be based upon one or more additional factors such as described above. For instance, the score may also be based upon a factor relating to the number of received messages (and/or phone calls).

In one example, the score may be computed via a machine learning model that is trained to generate such a score (e.g., a reputation score). It should be noted that as referred to herein, a machine learning model (MLM) (or machine learning-based model) may comprise a machine learning algorithm (MLA) that has been "trained" or configured in accordance with input training data to perform a particular service. For instance, an MLM may comprise a deep learning neural network, or deep neural network (DNN), a convolutional neural network (CNN), a generative adversarial network (GAN), a decision tree algorithm/model, such as gradient boosted decision tree (GBDT) (e.g., XGBoost, XGBR, or the like), a support vector machine (SVM), e.g., a non-binary, or multi-class classifier, a linear or non-linear classifier, k-means clustering and/or k-nearest neighbor (KNN) predictive models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs, or other clustering and/or classification models may be implemented in examples of the present disclosure, including time-series clustering algorithms, such as k-means clustering or variants thereof (e.g., partitioning around medioids (PAM), k-medioid, etc.), density-based spatial clustering of applications with noise (DBSCAN), and so forth.

In accordance with the present disclosure, a phone number reputation score may be computed via a machine learning model that is trained to generate such a reputation score, e.g., in accordance with an input vector of values from one or more records in a database of reported unwanted message information and/or other data sources, such as CDRs, etc. For instance, the MLM may learn appropriate weights with respect to different factors in order to generate an output score. For example, the MLM (e.g., a trained MLA) may be trained with a training data set comprising labeled entries/records from the database of reported unwanted message information. For instance, phone numbers may be labeled (e.g., by network personnel or via other mechanism) as being either "associated with malicious activity" or "not associated with malicious activity," or "associated with conversational text spam" or "not associated with conversational text spam," etc. The input factors may be the same or similar factors as described above, e.g., number of reported messages, number of reporting recipients/entities, report time span (e.g., time between reported messages), number and/or percent of inbound communication, two-way message volume or percentage, total message volume and/or frequency, etc. In one example, other factors associated with data from external sources, such as notifications of complaints from other MNOs about the same phone number, association of the phone number with known malicious IP addresses, a factor based upon a risk value assigned to a host service provider (e.g., a VoIP service provider, another MNO, etc.), and so forth may be used. In one example, the MLA/MLM may comprise a support vector machine (SVM) that may learn a separation hyperplane between the two categories. Thereafter, a phone number of an unknown categorization may be evaluated and determined to represent a point/vector in a relevant multi-dimensional feature space. The position may indicate the category of the phone number (e.g., malicious activity associated or not, conversational spam or not, etc.), where a distance of the point/vector from the separation hyperplane may be taken as a confidence score of the categorization. It should be noted that the foregoing is just one example of MLA/MLM-based phone number reputation score generation and that other, further, and different examples may utilize a different model, such as a decision tree algorithm, a deep neural network, a regression model (e.g., where a phone number is evaluated on an ongoing basis with new data replacing old data (e.g., a sliding window of the last 48 hours of activity, the last 72 hours of activity, or the like)), and so forth. For instance, in another example, a multi-class classifier may be trained/configured to provide a range of possible outputs, such as "conversational text spammer," "text spam marketing," "text phishing," or "non-malicious."

At step 390, the processing system performs at least one remedial action in a communication network in response to the identifying of the at least one source phone number. For instance, the at least one remedial action may comprise at least one of: blocking communications of the at least one source phone number via the communication network, adding the at least the least one source phone number to a list of malicious sources, transmitting a notification to at least one source network associated with the at least one source phone number of an identification of the at least one source phone number as a malicious source, and so forth. In one example, the processing system may be deployed in a component of the communication network. In one example, the at least one remedial action may comprise at least one of: adding the at least the least one source phone number to a list of conversational spam sources, when a threshold associated with the number of response messages is exceeded (e.g., in accordance with optional step 380) or transmitting a notification to at least one source network associated with the at least one source phone number of an identification of the at least one source phone number as a conversational spam source, when the threshold associated with the number of response messages is exceeded. In one example, the performing of the at least one remedial action may be further in response to the at least one score that may be generated at optional step 370 (e.g., when the score exceeds at least a third threshold (e.g., a threshold score/value associated with the score)). Following step 390, the method 300 proceeds to step 395. At step 395, the method 300 ends.

It should be noted that the method 300 may be expanded to include additional steps, or may be modified to replace steps with different steps, to combine steps, to omit steps, to perform steps in a different order, and so forth. For instance, in one example, the processing system may repeat one or more steps of the method 300, such as any one or more of steps 310-390 for additional data (e.g., for subsequent time periods), etc. For example, the set of reported messages associated the at least one of a plurality of source networks may be updated on an ongoing basis with new reported messages. In addition, older reported messages may be removed from the set. Alternatively, or in addition, the plurality of reported messages may be updated from the set, such that the plurality of reported messages are from a most recent sliding time window/investigation time period such as described above (e.g., a most recent 48 hour time period, 72 hour time period, etc.). However, phone numbers that may be blocked or added to a list may remain blocked or remain in the list for a longer duration of time, e.g., 30 days, 60 days, etc. Similarly, scores such as generated at optional step 370 may be updated on an ongoing basis. However, in one example, the highest score assigned to a source phone number within the last 30 days, last 60 days, or other time periods may remain assigned to the phone number, preventing the phone number from appearing non-malicious simply by refraining from spam activity for 48 hours, or the like. In one example, the excluding of message contents of optional step 350 may instead be performed as part of step 360. In one example, optional step 380 may be performed in the absence of step 360. For instance, a score may be calculated for each phone number, regardless of whether a specific threshold or thresholds for one or more particular data points is/are exceeded. In one example, a score may be further based upon message intents.

For example, when counting each message reported with respect to a particular source phone number, the count may be modified based upon an intent of the message content (e.g., an intent factor). For instance, as noted above, "Hello" is a common greeting and may only weakly indicate malicious conversational intent, while profanity or the like may indicate strong negative conversational intent. Likewise, "This is Maria, Janet would you like me to cook chicken dinner tomorrow?" may indicate very high malicious intent if it is sent by multiple senders and/or to numerous recipients. Thus, in one example, intent factors may be useful for avoiding false positives, such as cases where an unhappy recipient of a group spam message chooses to reply-all with one or more expletive phrases. In one example, an intent factor may be assigned to message content in accordance with an intent model, e.g., an MLM/MLA that is trained to classify and/or score the "intent" of a message as positive/negative, positive/neutral/negative, and/or to output a score on a positive/negative scale, etc.

In one example, the at least one remedial action of step 390 may comprise providing the at least one score as an input to at least one malicious activity detection model, e.g., in an example in which the score generated at optional step 380 is not computed in accordance with an MLM as described above. For instance, the score of optional step 380 may be based upon features that are more specific to conversational spam, whereas the malicious activity detection model may be trained/configured to provide an overall threat score, to categorize among different threat categories, to provide scores indicative of different threat categories (e.g., a phone number can be associated with conversational spam as well as text phishing, poison links, etc.), and so forth. The malicious activity detection model may be the same or similar to the example MLMs as described above. In one example, the method 300 may be expanded or modified to include steps, functions, and/or operations, or other features described above in connection with the example(s) of FIGS. 1 and 2, or as described elsewhere herein. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 4 depicts a high-level block diagram of a computing system 400 (e.g., a computing device or processing system) specifically programmed to perform the functions described herein. For example, any one or more components, devices, and/or systems illustrated in FIG. 1, or described in connection with the examples of FIGS. 2 and 3, may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where the hardware processor element 402 may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for identifying at least one source phone number that is a source of a first set of messages containing message contents of a set of message contents and where a number of reporting recipients associated with the first set of messages exceeds a threshold, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, the computing system 400 may employ a plurality of hardware processor elements. Furthermore, although only one computing device is shown in FIG. 4, if the method(s) as discussed above is implemented in a distributed or parallel manner for a particular illustrative example, e.g., the steps of the above method(s) or the entire method(s) are implemented across multiple or parallel computing devices, then the computing system 400 of FIG. 4 may represent each of those multiple or parallel computing devices. Furthermore, one or more hardware processor elements (e.g., hardware processor element 402) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 405 for identifying at least one source phone number that is a source of a first set of messages containing message contents of a set of message contents and where a number of reporting recipients associated with the first set of messages exceeds a threshold (e.g., a software program comprising computer-executable instructions) can be loaded into memory 404 and executed by hardware processor element 402 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 402) executing the computer-readable instructions relating to the above described method(s) can be perceived as a programmed processor or a specialized processor. As such, the present module 405 for identifying at least one source phone number that is a source of a first set of messages containing message contents of a set of message contents and where a number of reporting recipients associated with the first set of messages exceeds a threshold (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:

identifying, by a processing system including at least one processor, within a plurality of reported messages, a plurality of message contents, wherein each reported message of the plurality of reported messages is reported as an unwanted message;

determining, by the processing system, for each respective message content of the plurality of message contents, a respective count of a plurality of counts, the respective count comprising a number of occurrences of the respective message content within the plurality of reported messages;

identifying, by the processing system, a set of message contents within the plurality of message contents for which each of associated counts of the plurality of counts exceeds a first threshold;

identifying, by the processing system, at least one source account identifier that is a source of a first set of messages within the plurality of reported messages containing one or more message contents of the set of message contents, and where a number of reporting entities associated with the first set of messages exceeds at least a second threshold; and performing, by the processing system, at least one remedial action in a communication network in response to the identifying of the at least one source account identifier.

2. The method of claim 1, wherein the plurality of reported messages comprises messages reported within a defined time period.

3. The method of claim 1, wherein the at least one remedial action comprises at least one of:

blocking messages of the at least one source account identifier via the communication network;

adding the at least one source account identifier to a list of malicious sources; or transmitting a notification to at least one source network associated with the at least one source account identifier of an identification of the at least one source account identifier as a malicious source.

4. The method of claim 1, wherein the at least the second threshold comprises a plurality of thresholds including at least two of:

a threshold associated with a number of reporting entities per source;

a threshold associated with a number of reporting entities per source and for which a time span over which reported messages of a given source are reported exceeds a threshold time period; or a threshold associated with a number of reporting entities per source for messages that exclude one or more message contents from among the plurality of message contents having highest counts from among the plurality of counts.

5. The method of claim 1, wherein the plurality of reported messages comprises messages associated with at least one selected source network.

6. The method of claim 5, wherein the at least one selected source network is designated as being associated with a high volume of unwanted messages.

7. The method of claim 5, further comprising:

extracting the plurality of reported messages from a set of reported messages associated with at least one of a plurality of source networks.

8. The method of claim 1, wherein for the each respective message content of the plurality of message contents, the respective count of the plurality of counts comprises the number of occurrences of the respective message content within the plurality of reported messages and a count modifier based upon a similarity measure of one or more other message contents of the plurality of message contents.

9. The method of claim 8, wherein the similarity measure comprises a distance measure based upon embeddings of the respective message content and the one or more other message contents.

10. The method of claim 1, further comprising:

generating at least one score for the at least one source account identifier, the at least one score based on a number of messages of the first set of messages.

11. The method of claim 10, wherein the at least one score is further based on a number of independent reporting entities reporting the first set of messages from among the plurality of reported messages associated with the at least one source account identifier.

12. The method of claim 10, wherein the at least one score is further based on at least one of: a message volume or a message frequency of the at least one source account identifier within a defined time period associated with the plurality of reported messages.

13. The method of claim 10, wherein the performing of the at least one remedial action is further in response to the at least one score.

14. The method of claim 13, wherein the at least one remedial action comprises providing the at least one score as an input to at least one malicious activity detection model.

15. The method of claim 1, further comprising:

excluding, from the set of message contents, at least one message content that is identified as being associated with a non-conversational spam activity.

16. The method of claim 15, wherein the at least one message content is identified as being associated with a marketing activity in accordance with a classification model for detecting marketing activity in messages.

17. The method of claim 15, further comprising:

identifying a number of response messages for which the at least one source account identifier is a recipient within a defined time period associated with the plurality of reported messages.

18. The method of claim 17, wherein the at least one remedial action comprises at least one of:

adding the at least one source account identifier to a list of conversational spam sources, when a threshold associated with the number of response messages is exceeded; or transmitting a notification to at least one source network associated with the at least one source account identifier of an identification of the at least one source account identifier as a conversational spam source, when the threshold associated with the number of response messages is exceeded.

19. A non-transitory computer-readable medium storing instructions which, when executed by a processing system including at least one processor, cause the processing system to perform operations, the operations comprising:

identifying within a plurality of reported messages, a plurality of message contents, wherein each reported message of the plurality of reported messages is reported as an unwanted message;

determining, for each respective message content of the plurality of message contents, a respective count of a plurality of counts, the respective count comprising a number of occurrences of the respective message content within the plurality of reported messages;

identifying a set of message contents within the plurality of message contents for which each of associated counts of the plurality of counts exceeds a first threshold;

identifying at least one source account identifier that is a source of a first set of messages within the plurality of reported messages containing one or more message contents of the set of message contents, and where a number of reporting entities associated with the first set of messages exceeds at least a second threshold; and performing at least one remedial action in a communication network in response to the identifying of the at least one source account identifier.

20. An apparatus comprising:

a processing system including at least one processor; and a computer-readable medium storing instructions which, when executed by the processing system, cause the processing system to perform operations, the operations comprising:

identifying within a plurality of reported messages, a plurality of message contents, wherein each reported message of the plurality of reported messages is reported as an unwanted message;

determining, for each respective message content of the plurality of message contents, a respective count of a plurality of counts, the respective count comprising a number of occurrences of the respective message content within the plurality of reported messages;

identifying a set of message contents within the plurality of message contents for which each of associated counts of the plurality of counts exceeds a first threshold;

identifying at least one source account identifier that is a source of a first set of messages within the plurality of reported messages containing one or more message contents of the set of message contents, and where a number of reporting entities associated with the first set of messages exceeds at least a second threshold; and performing at least one remedial action in a communication network in response to the identifying of the at least one source account identifier.

* * * * *